(12) United States Patent
Roesler

(10) Patent No.: US 7,780,215 B2
(45) Date of Patent: Aug. 24, 2010

(54) TRUNK LID FOR VEHICLE BODY

(75) Inventor: Matthias Roesler, Stuttgart (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 424 days.

(21) Appl. No.: 11/962,616

(22) Filed: Dec. 21, 2007

(65) Prior Publication Data

US 2008/0179909 A1 Jul. 31, 2008

(30) Foreign Application Priority Data

Dec. 23, 2006 (DE) .................... 10 2006 061 489

(51) Int. Cl.
*B60J 7/20* (2006.01)
(52) U.S. Cl. ................................. 296/107.08
(58) Field of Classification Search .................. 296/76, 296/107.08, 146.11, 146.12, 136.05, 136.06; 49/246, 248
See application file for complete search history.

(56) References Cited

U.S. PATENT DOCUMENTS

| | | | | |
|---|---|---|---|---|
| 5,209,544 | A * | 5/1993 | Benedetto et al. | 296/107.18 |
| 5,533,777 | A * | 7/1996 | Kleemann et al. | 296/117 |
| 6,250,707 | B1 | 6/2001 | Dintner et al. | |
| 6,761,393 | B2 * | 7/2004 | Durand et al. | 296/146.8 |
| 6,799,788 | B2 * | 10/2004 | Plesternings | 296/107.08 |
| 6,824,194 | B2 * | 11/2004 | Weissmueller et al. | 296/136.05 |
| 6,945,590 | B2 * | 9/2005 | Doncov et al. | 296/147 |
| 6,948,762 | B2 * | 9/2005 | Antreich | 296/136.06 |
| 2001/0004156 | A1 * | 6/2001 | Neubrand et al. | 296/76 |
| 2004/0178656 | A1 | 9/2004 | Hahn | |
| 2004/0178658 | A1 * | 9/2004 | Willard | 296/136.05 |
| 2007/0063534 | A1 | 3/2007 | Baumeier | |
| 2009/0015039 | A1 | 1/2009 | Meinert | |

FOREIGN PATENT DOCUMENTS

| | | |
|---|---|---|
| DE | 19932500 A1 | 2/2001 |
| DE | 100 64 363 | 7/2002 |
| DE | 102005006272 A1 | 8/2006 |
| WO | 2004078505 A1 | 9/2004 |

* cited by examiner

*Primary Examiner*—H Gutman
(74) *Attorney, Agent, or Firm*—Brooks Kushman P.C.

(57) ABSTRACT

A guide rod system movably connects a trunk lid to a vehicle such that the lid is movable between a base position in which the lid covers a trunk of the vehicle, a luggage storage position in which the rear of the lid is raised relative to the trunk, and a roof transport position in which the front of the lid is raised relative to the trunk. The guide rod system includes first and second guide rods and a coupler. The first guide rod is respectively connected at opposite ends to the front of the lid and the vehicle. The second guide rod is respectively connected at opposite ends to the rear of the lid and the vehicle. The coupler is connected between the guide rods to actuate the guide rods to move the lid between the base, luggage storage, and roof transport positions.

18 Claims, 3 Drawing Sheets

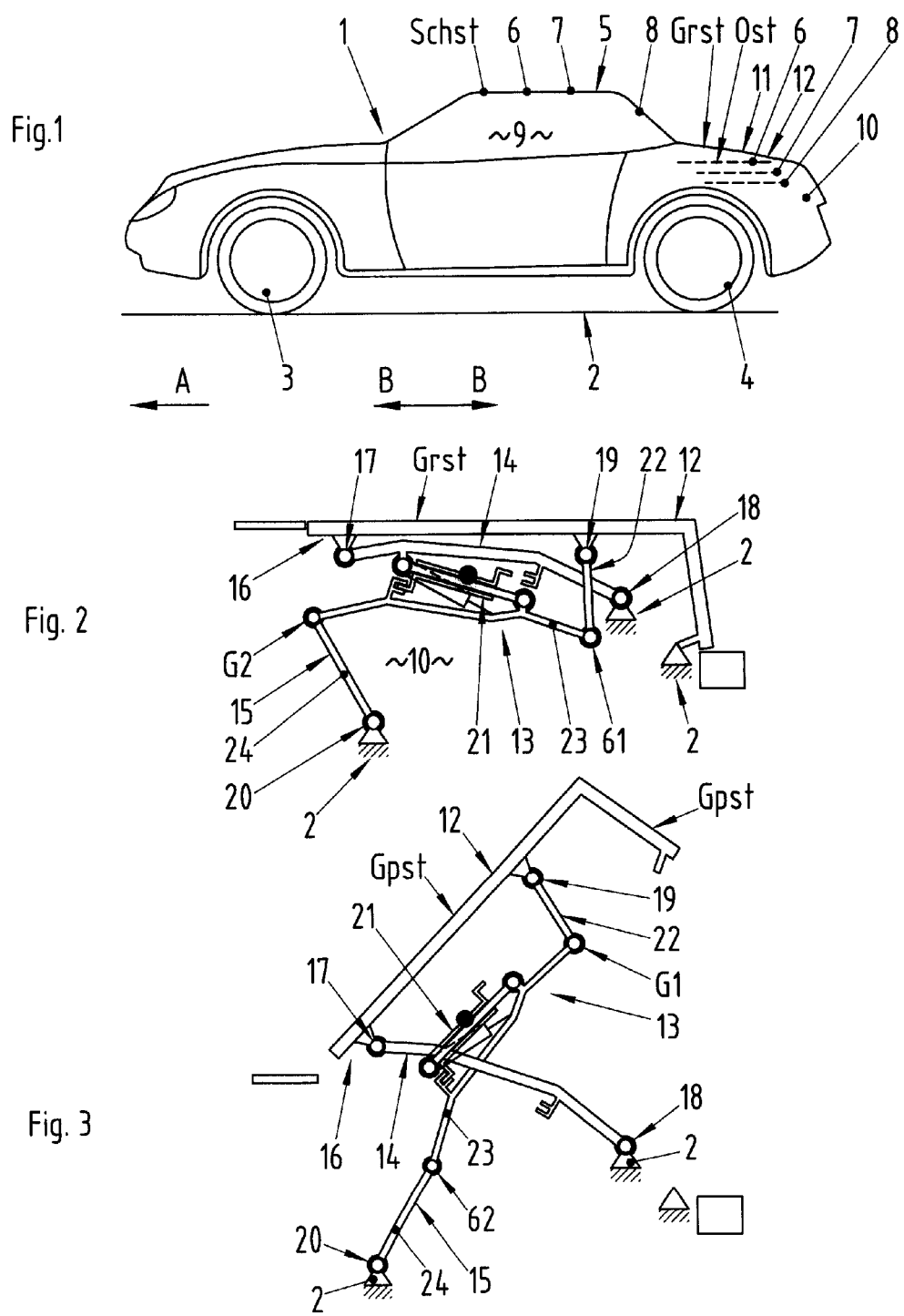

TRUNK LID FOR VEHICLE BODY

CROSS-REFERENCE TO RELATED APPLICATIONS

This application claims foreign priority benefits under 35 U.S.C. §119(a)-(d) to DE 10 2006 061 489.5, filed Dec. 23, 2006, which is hereby incorporated by reference in its entirety.

BACKGROUND OF THE INVENTION

1. Field of the Invention

The present invention relates to vehicle trunk lids.

2. Background Art

U.S. Patent Application Publication No. 2004/0178656 describes a convertible vehicle roof which is movable between a closed position in which the roof covers the passenger compartment and an opened position in which the roof is stored in a storage compartment of the vehicle body. A trunk lid for the storage compartment is movable between a luggage storage position and a roof transport position. In the luggage storage position, the trunk lid is raised at its rear and lowered at its front relative to the storage compartment. In the roof transport position, the trunk lid is raised at its front and lowered at its rear. The trunk lid is connected to a first guide rod by which the trunk lid may be moved into the luggage storage position. Second and third guide rods are mounted on the first guide rod forming a type of parallelogram by which the trunk lid may be moved into the roof transport position.

DE 199 32 500 C2 (corresponding to U.S. Pat. No. 6,250,707) describes a stowage compartment for a vehicle having a movable roof. The vehicle includes a pivotable trunk closure which, as a trunk lid, may swivel about a swivel axis situated close to its front edge, or as a folding top compartment lid, may swivel about a rear swivel axis situated close to its rear edge. The trunk closure is articulately connected to an auxiliary frame. A stowage compartment cover is connected to the auxiliary frame.

DE 100 64 363 C2 describes a multipart vehicle cover for a folding top compartment. The cover is situated above the folding top space and is supported on the vehicle body by guide rods. The guide rods are positioned with respect to one another in the manner of scissors and are mounted on the folding top compartment cover and the vehicle body.

SUMMARY OF THE INVENTION

An object of the present invention is a trunk lid movably connected to the body of a vehicle having a convertible roof in which the trunk lid may efficiently move between a base position in which the trunk lid covers a storage compartment of the vehicle body, a luggage storage position in which the rear portion of the trunk lid is raised relative to the storage compartment, and a roof transport position in which the front portion of the trunk lid is raised relative to the storage compartment.

In carrying out the above object and other objects, the present invention provides a trunk lid assembly. The trunk lid assembly includes a trunk lid having a front region and a rear region. The trunk lid assembly further includes a guide rod system for movably connecting the trunk lid to a vehicle body such that the trunk lid is movable between a base position in which the trunk lid covers a storage compartment (e.g., a trunk) of the vehicle body, a luggage storage position in which the rear region of the trunk lid is raised relative to the storage compartment, and a roof transport position in which the front region of the trunk lid is raised relative to the storage compartment. The guide rod system includes first and second guide rod units and a coupling device. The first guide rod unit is articulately connected at a first end to the front region of the trunk lid via a first bearing and is articulately connected at a second end to the vehicle body via a second bearing. The second guide rod unit is articulately connected at a first end to the rear region of the trunk lid via a third bearing and is articulately connected at a second end to the vehicle body via a fourth bearing. The coupling device is connected between the first and second guide rod units to actuate the first and second guide rod units to move the trunk lid between the base, luggage storage, and roof transport positions.

Further, in carrying out the above object and other objects, the present invention provides a guide rod system for movably connecting a trunk lid to a vehicle body. The system includes a first guide rod articulately connected at a first end to a front region of a trunk lid via a first bearing and articulately connected at a second end to a vehicle body via a second bearing. The system further includes a second guide rod articulately connected at a first end to a rear region of the trunk lid via a third bearing and articulately connected at a second end to the vehicle body via a fourth bearing. The system further includes a coupling device connected between the first and second guide rods to actuate the first and second guide rods to move the trunk lid between a base position in which the trunk lid covers a trunk of the vehicle body, a luggage storage position in which the rear region of the trunk lid is raised relative to the trunk, and a roof transport position in which the front region of the trunk lid is raised relative to the trunk.

In embodiments of the present invention, a guide rod system having first and second guide rod units and a coupling device is operable to movably connect a trunk lid to a vehicle body such that the trunk lid is movable between a base position, a luggage storage position, and a roof transport position. The trunk lid may be controlled between the first and second guide rod units, not only in the base position but also in the luggage storage position and the roof transport position, and may be fixed in the roof transport position.

A first bearing connects one end of the first guide rod unit to the trunk lid. A second bearing connects the other end of the first guide rod unit to the vehicle body. The second guide rod unit includes first and second guide rod elements which are connected to one another via an articulated joint. A third bearing connects the other end of the first guide rod element to the trunk lid. A fourth bearing connects the other end of the second guide rod element to the vehicle body. The fourth bearing includes an easily implementable sliding device which is oriented in the longitudinal vehicle direction. Alternatively, the second guide rod unit is formed by the first and second guide rod elements and a third guide rod element which cooperate by connection of first and second articulated joints.

A coupling lever, which may be easily implemented and which cooperates with a coupling device, acts between the first and second guide rod units. A sliding member on the coupling lever has coupling elements that cooperate with the first and second guide rod units. An actuating unit is used to influence the coupling device.

The above features, and other features and advantages of the present invention as readily apparent from the following detailed descriptions thereof when taken in connection with the accompanying drawings.

BRIEF DESCRIPTION OF THE DRAWINGS

FIG. 1 illustrates a vehicle in accordance with embodiments of the present invention;

FIG. 2 illustrates a trunk lid for a vehicle body in accordance with a first embodiment of the present invention, in which the trunk lid is in a base position;

FIG. 3 illustrates the trunk lid shown in FIG. 2 in a luggage storage position;

DETAILED DESCRIPTION OF THE PREFERRED EMBODIMENT(S)

Figure 4:
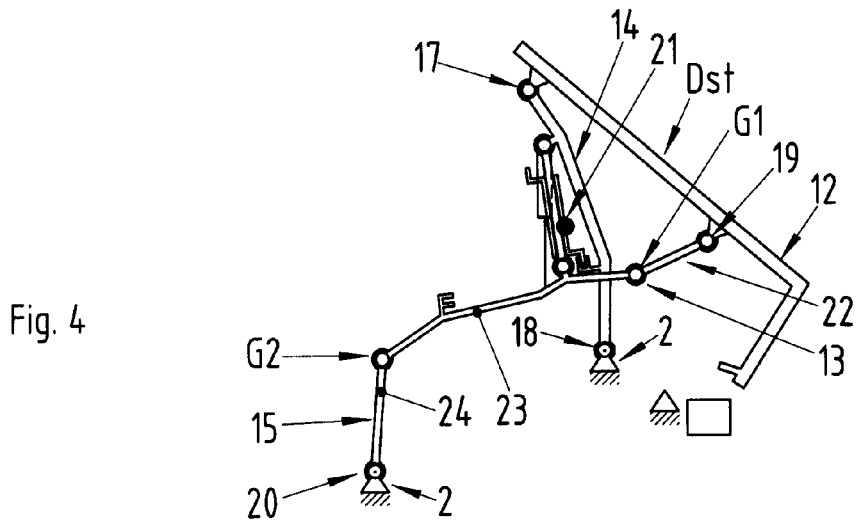
FIG. 4 illustrates the trunk lid shown in FIG. 2 in a roof transport position.

Referring now to FIG. 1, a vehicle 1 in accordance with embodiments of the present invention is shown. Vehicle 1, such as a passenger vehicle, includes a body 2 which is supported by wheels 3, 4. Vehicle 1 further includes a movable (e.g., convertible) roof 5. Roof 5 includes multiple roof parts 6, 7, 8 which are movable between a closed position Schst and an opened position Ost. In the closed position Schst, roof parts 6, 7, 8 extend over a passenger compartment 9 of vehicle body 2. In the opened position Ost, roof parts 6, 7, 8 are folded over one another and stored within a storage compartment 10 of vehicle body 2. Storage compartment 10 is located in a rear region 11 of vehicle body 2.

A trunk lid 12 associated with storage compartment 10 is movably connected to vehicle body 2 to move relative to storage compartment 10. Trunk lid 12 is movable between a base position Grst, a luggage storage position Gpst, and a roof transport position Dst. In general, in the base position Grst, trunk lid 12 is closed to cover storage compartment 10. In the luggage storage position Gpst, the rear portion of trunk lid 12 is opened relative to storage compartment 10 to thereby enable storage compartment 10 to be loaded and unloaded. In the roof transport position Dst, the front portion of trunk lid 12 is opened relative to storage compartment 10 to thereby enable roof 5 to move between its closed and opened positions Schst, Ost.

Figure 5:
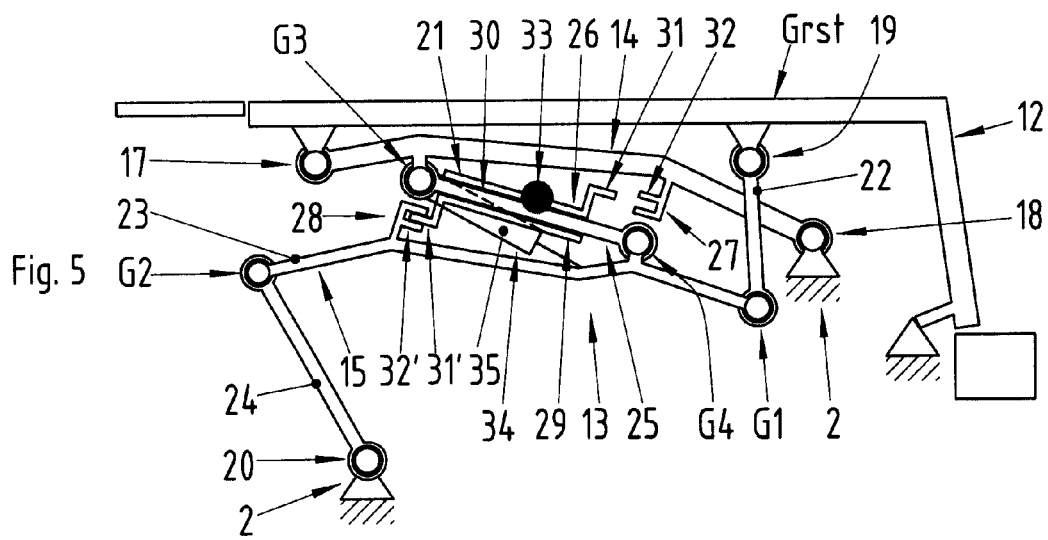
FIG. 5 illustrates an enlarged view of FIG. 2.

Referring now to FIGS. 2, 3, 4, and 5, with continual reference to FIG. 1, the operation for moving trunk lid 12 between the base position Grst, the luggage storage position Gpst, and the roof transport position Dst will be described. FIGS. 2 and 5 illustrate trunk lid 12 in its base position Grst. FIG. 3 illustrates trunk lid 12 in its luggage storage position Gpst. FIG. 4 illustrates trunk lid 12 in its roof transport position Dst.

A guide rod system 13 operably connects trunk lid 12 to vehicle body 2 to actuate the trunk lid between the base position Grst, the luggage storage position Gpst, and the roof transport position Dst. Guide rod system 13 includes a first guide rod unit 14 and a second guide rod unit 15. The front end of first guide rod unit 14 is connected to a front region 16 of trunk lid 12 via a first bearing 17. The rear end of first guide rod unit 14 is connected to vehicle body 2 via a second bearing 18 mounted on the vehicle body. Second guide rod unit 15 is connected at one end to trunk lid 12 via a third bearing 19. Third bearing 19 is mounted at a distance from first bearing 17, viewed in the opposite direction of vehicle travel A. Second guide rod unit 15 is connected at its other end to vehicle body 2 via a fourth bearing 20 mounted on the vehicle body.

Second guide rod unit 15 is formed by first, second, and third guide rod elements 22, 23, and 24. A first articulated joint G1 is between first and second guide rod elements 22, 23. A second articulated joint G2 is between second and third guide rod elements 23, 24. First and second guide rod units 14, 15 are part of a seven-bar kinematic linkage.

A coupling device 21 operates between first and second guide rod units 14, 15 to actuate trunk lid 12 between the base position Grst, the luggage storage position Gpst, and the roof transport position Dst.

With reference to FIG. 5, a coupling lever 25 acts between first and second guide rod units 14, 15. By a third articulated joint G3, coupling lever 25 cooperates with first guide rod unit 14. By a fourth articulated joint G4, coupling lever 25 cooperates with second guide rod element 23 of second guide rod unit 15.

Coupling lever 25 cooperates with coupling device 21. Coupling device 21 has a sliding member 26 on coupling lever 25. Sliding member 26 is axially displaceable on coupling lever 25. Sliding member 26 is associated with coupling elements 27, 28 which respectively act on first and second guide rod units 14, 15. For this purpose, sliding member 26 is in the form of a tube 29 which encloses a shaft section 30 of coupling lever 25. Coupling elements 27, 28 at one end are affixed to respective ends of sliding member 26. Coupling element 27 at its other end is affixed to first guide rod unit 14. Coupling element 28 at its other end is affixed to second guide rod element 23 of second guide rod unit 15.

Coupling element 27 has an engaging member 31 and a receiving member 32, which cooperate with a form-fit connection. Similarly, coupling element 28 has an engaging member 31' and a receiving member 32', which cooperate with a form-fit connection. Engaging members 31, 31' are mounted on the ends of tube 29 of sliding member 26, and receiving members 32, 32' are respectively mounted on first and second guide rod units 14, 15.

A first actuating unit 33 which acts between coupling lever 25 and sliding member 26 (i.e., between shaft section 30 and tube 29) is used to influence coupling device 21. First actuating unit 33 may be formed by a sliding gear transmission, rack-and-pinion gear, or the like.

A second actuating unit 34 engages with guide rod system 13 at the articulated joint G3 for first guide rod unit 14 to move trunk lid 12 between the base position Gst, the luggage storage position Gpst, and the roof transport position Dst. Second actuating unit 34 may be formed by a hydraulic cylinder 35 or an electric motor.

Figure 6:
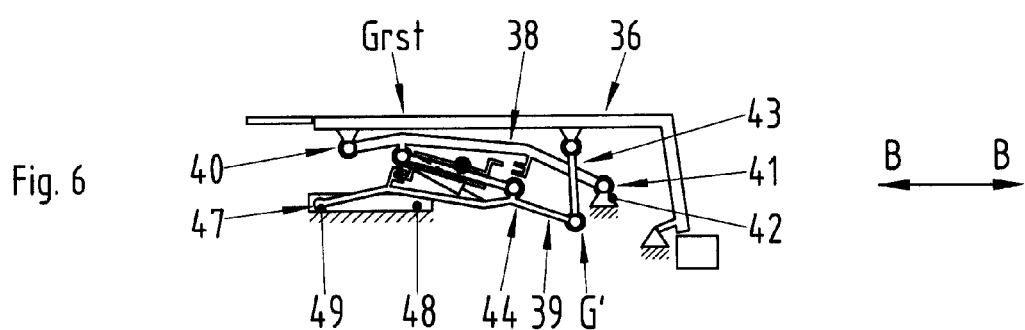
FIG. 6 illustrates a trunk lid for a vehicle body in accordance with a second embodiment of the present invention, in which the trunk lid is in the base position.
Figure 7:
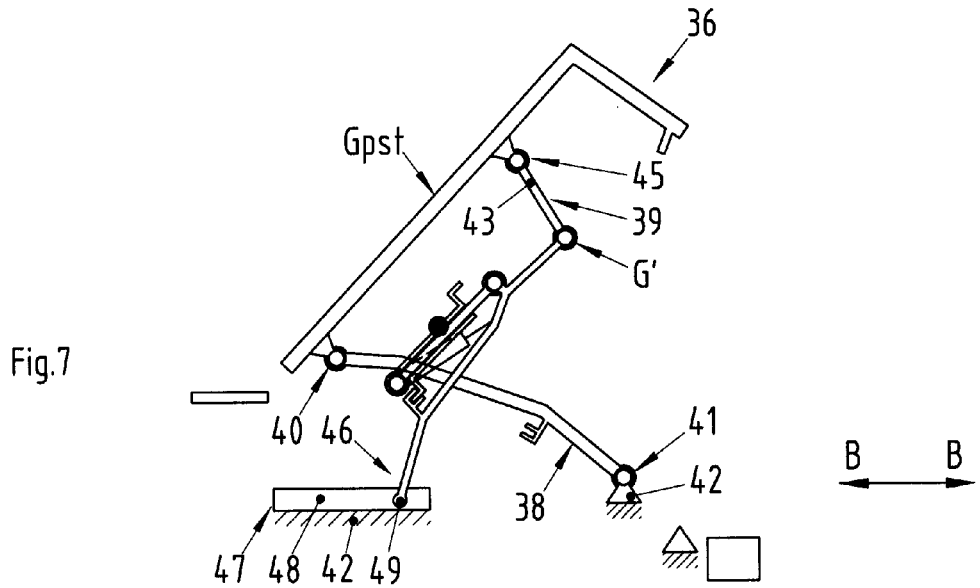
FIG. 7 illustrates the trunk lid shown in FIG. 6 in the luggage transport position.
Figure 8:
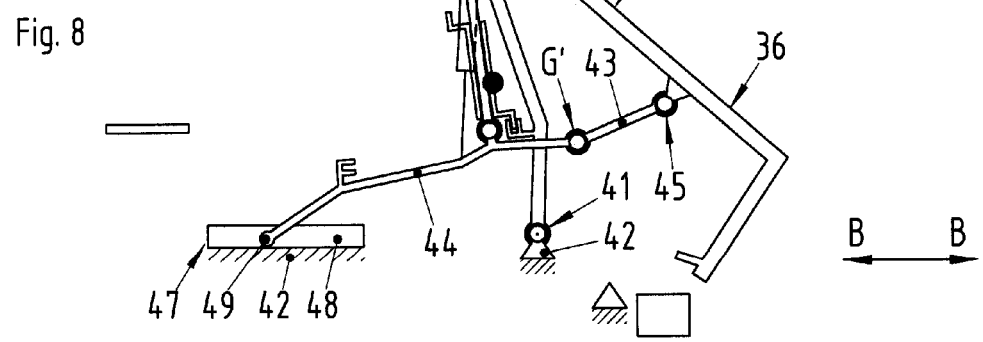
FIG. 8 illustrates the trunk lid shown in FIG. 6 in the roof storage position.
Figure 9:
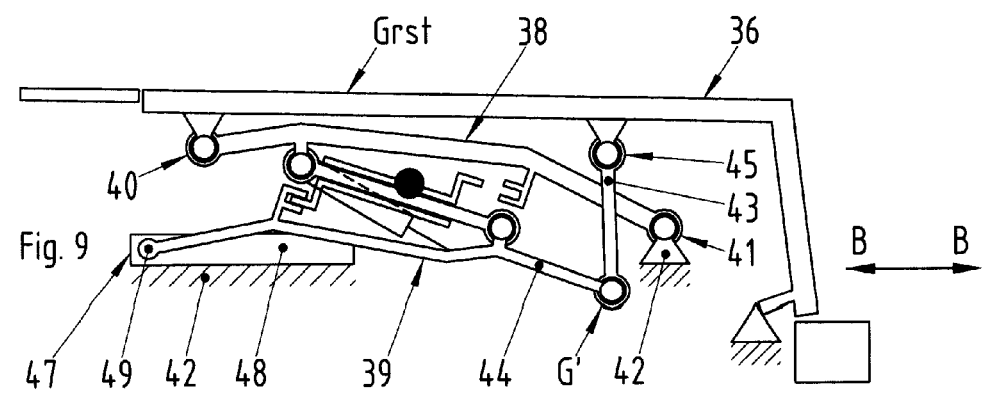
FIG. 9 illustrates an enlarged view of FIG. 6.

Referring now to FIGS. 6, 7, 8, and 9, a trunk lid 36 in accordance with a second embodiment of the present invention will be described. FIGS. 6 and 9 illustrate trunk lid 36 in its base position Grst. FIG. 7 illustrates trunk lid 36 in its luggage storage position Gpst. FIG. 8 illustrates trunk lid 36 in its roof transport position Dst.

A lever system having first and second guide rod units 38, 39 is operable to move trunk lid 36 between the base position Grst, the luggage storage position Gpst, and the roof transport position Dst. First guide rod unit 38 is mounted on trunk lid 36 by a first bearing 40 and is mounted on vehicle body 42 by a second bearing 41. Second guide rod unit 39 includes first and second guide rod elements 43, 44 which are connected via an articulated joint G'. First guide rod element 43 of second guide rod unit 39 is held in position on trunk lid 36 by a third bearing 45. Second guide rod element 44 of second guide rod unit 39 is held in position on vehicle body 42 by a fourth bearing 46. Fourth bearing 46 is a sliding device 47 having a guide element 48 for a swivel pin 49 and is oriented in the longitudinal vehicle direction B-B.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A trunk lid assembly comprising:
a trunk lid having a front region and a rear region; and
a guide rod system for movably connecting the trunk lid to a vehicle body such that the trunk lid is movable between a base position in which the trunk lid covers a storage compartment of the vehicle body, a luggage storage position in which the rear region of the trunk lid is raised relative to the storage compartment, and a roof transport position in which the front region of the trunk lid is raised relative to the storage compartment;
wherein the guide rod system includes first and second guide rod units and a coupling device, wherein the first guide rod unit is articulately connected at a first end to the front region of the trunk lid via a first bearing and is articulately connected at a second end to the vehicle body via a second bearing, wherein the second guide rod unit is articulately connected at a first end to the rear region of the trunk lid via a third bearing and is articulately connected at a second end to the vehicle body via a fourth bearing;
wherein the second guide rod unit includes first and second guide rod elements which are connected via an articulated joint, wherein the fourth bearing has a sliding device which is movable in the longitudinal vehicle direction;
wherein the coupling device is connected between the first and second guide rod units to actuate the first and second guide rod units to move the trunk lid between the base position, the luggage storage position, and the roof transport position.

2. The trunk lid assembly of claim 1 wherein:
the second bearing is stationarily provided on the vehicle body.

3. The trunk lid assembly of claim 1 wherein:
the sliding device includes a guide element for a swivel pin for the fourth bearing.

4. The trunk lid assembly of claim 3 wherein:
the guide element is oriented horizontally and in the longitudinal vehicle direction.

5. The trunk lid assembly of claim 1 wherein:
the first and second guide rod units are part of a multi-bar kinematic linkage.

6. The trunk lid assembly of claim 1 wherein:
the guide rod system further includes a coupling lever which cooperates with the coupling device and is connected between the first and second guide rod units.

7. The trunk lid assembly of claim 6 further comprising:
a first actuating device which cooperates with the coupling device.

8. The trunk lid assembly of claim 1 wherein:
the trunk lid enables the storage compartment to be loaded and unloaded when the trunk lid is in the luggage storage position as the rear region of the trunk lid is raised relative to the storage compartment;
wherein the trunk lid enables a convertible roof to move between a closed position in which the roof covers a passenger compartment of the vehicle body and an opened position in which the roof is stored within the storage compartment as the front region of the trunk lid is raised relative to the storage compartment.

9. A trunk lid assembly comprising:
a trunk lid having a front region and a rear region; and
a guide rod system for movably connecting the trunk lid to a vehicle body such that the trunk lid is movable between a base position in which the trunk lid covers a storage compartment of the vehicle body, a luggage storage position in which the rear region of the trunk lid is raised relative to the storage compartment, and a roof transport position in which the front region of the trunk lid is raised relative to the storage compartment;
wherein the guide rod system includes first and second guide rod units and a coupling device, wherein the first guide rod unit is articulately connected at a first end to the front region of the trunk lid via a first bearing and is articulately connected at a second end to the vehicle body via a second bearing, wherein the second guide rod unit is articulately connected at a first end to the rear region of the trunk lid via a third bearing and is articulately connected at a second end to the vehicle body via a fourth bearing;
wherein the coupling device is connected between the first and second guide rod units to actuate the first and second guide rod units to move the trunk lid between the base position, the luggage storage position, and the roof transport position;
wherein the guide rod system further includes a coupling lever which cooperates with the coupling device and is connected between the first and second guide rod units;
wherein the coupling device includes a sliding member on the coupling lever which has coupling elements that cooperate with the first and second guide rod units.

10. The trunk lid assembly of claim 9 wherein:
the second guide rod unit includes first, second, and third guide rod elements, wherein the first and second guide rod elements are connected at one end via a first articulated joint, wherein the second and third guide rod elements are connected at one end via a second articulated joint.

11. The trunk lid assembly of claim 10 wherein:
the first and second guide rod units are part of a multi-bar kinematic linkage, wherein the multi-bar kinematic linkage is a seven-bar kinematic linkage.

12. The trunk lid assembly of claim 9 wherein:
the coupling elements are affixed at one end to the sliding member and are respectively affixed on the other end to the first and second guide rod units.

13. The trunk lid assembly of claim 12 wherein:
each coupling element has an engaging member and a receiving member which cooperate with a form-fit connection.

14. The trunk lid assembly of claim 13 wherein:
the engaging members are respectively situated at the ends of the sliding member.

15. The trunk lid assembly of claim 13 wherein:
the receiving members are respectively affixed to the first and second guide rod units.

16. A trunk lid assembly comprising:
a trunk lid having a front region and a rear region;
a guide rod system for movably connecting the trunk lid to a vehicle body such that the trunk lid is movable between a base position in which the trunk lid covers a storage compartment of the vehicle body, a luggage storage position in which the rear region of the trunk lid is raised relative to the storage compartment, and a roof transport position in which the front region of the trunk lid is raised relative to the storage compartment;

wherein the guide rod system includes first and second guide rod units and a coupling device, wherein the first guide rod unit is articulately connected at a first end to the front region of the trunk lid via a first bearing and is articulately connected at a second end to the vehicle body via a second bearing, wherein the second guide rod unit is articulately connected at a first end to the rear region of the trunk lid via a third bearing and is articulately connected at a second end to the vehicle body via a fourth bearing;

wherein the coupling device is connected between the first and second guide rod units to actuate the first and second guide rod units to move the trunk lid between the base position, the luggage storage position, and the roof transport position;

wherein the guide rod system further includes a coupling lever which cooperates with the coupling device and is connected between the first and second guide rod units;

wherein the coupling device includes a sliding member on the coupling lever which has coupling elements that cooperate with the first and second guide rod units; and a first actuating device which cooperates with the coupling device, wherein the first actuating device acts between the coupling lever and the sliding member.

17. The trunk lid assembly of claim 16 further comprising:

a second actuating device which engages with the guide rod system to actuate the trunk lid between the base position, the luggage storage position, and the roof transport position.

18. The trunk lid assembly of claim 17 wherein:

the first actuating device includes gearing and the second actuating device includes a hydraulic cylinder.

* * * * *